United States Patent [19]

Morimoto

[11] Patent Number: 4,953,926
[45] Date of Patent: Sep. 4, 1990

[54] SCANNING OPTICAL SYSTEM FOR USE IN A LASER BEAM PRINTER

[75] Inventor: Akira Morimoto, Tokyo, Japan

[73] Assignee: Asahi Kogaku Kogyo Kabushiki Kaisha, Tokyo, Japan

[21] Appl. No.: 322,030

[22] Filed: Mar. 13, 1989

[30] Foreign Application Priority Data

Mar. 14, 1988 [JP] Japan .................................. 63-59821
Jan. 19, 1989 [JP] Japan .................................. 1-10633

[51] Int. Cl.$^5$ ............................................. G02B 26/10
[52] U.S. Cl. ........................................ 350/6.8; 350/479
[58] Field of Search ................. 350/6.8, 6.7, 6.6, 6.5, 350/6.91, 479, 420; 250/235

[56] References Cited

U.S. PATENT DOCUMENTS

| | | | |
|---|---|---|---|
| 4,707,085 | 11/1987 | Takanashi et al. | 350/6.8 |
| 4,756,583 | 7/1988 | Morimoto | 350/6.8 |
| 4,818,046 | 4/1989 | Kondo | 350/6.8 |
| 4,859,011 | 8/1989 | Takanashi | 350/6.8 |

FOREIGN PATENT DOCUMENTS 58-15767 3/1983 Japan .
63-52512 3/1988 Japan .

*Primary Examiner*—Bruce Y. Arnold
*Assistant Examiner*—Loha Ben
*Attorney, Agent, or Firm*—Sughrue, Mion, Zinn, Macpeak & Seas

[57] ABSTRACT

An optical scanning system for use in a laser beam printer is disclosed which comprises a cylindrical lens for imaging laser light in an auxiliary scanning cross section at a point in front of a deflector and an anamorphic scanning lens unit which converges the light rays deflected by the deflector at a point on a scanning surface. The scanning lens unit has, in order from the deflector side, a first lens which is a negative lens element having a concave toric surface with a stronger curvature in the auxiliary scanning cross section and a second lens having a convex toric surface with a stronger curvature in the auxiliary scanning cross section. The optical system further satisfying the following condition:

$$0.015f < l < 0.160f$$

where f is the focal length of the scanning lens unit in a main scanning cross section, and l is the distance between the position at which laser light is imaged with the cylindrical lens and the point at which the laser light is deflected with the deflector.

14 Claims, 5 Drawing Sheets

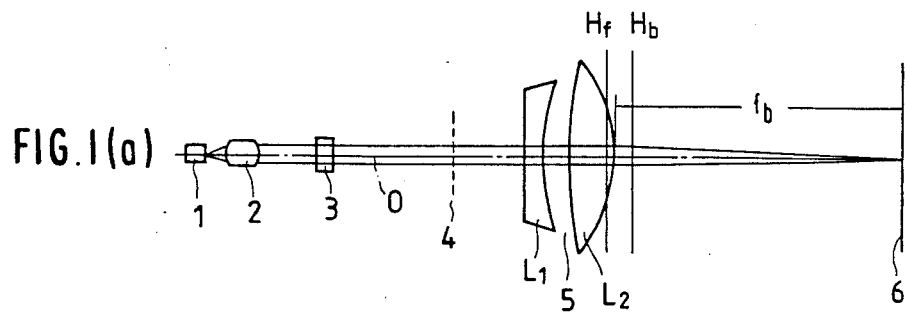
FIG.1(a)
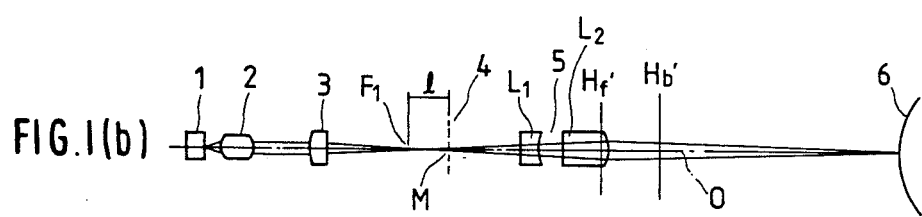
FIG.1(b)
FIG.2
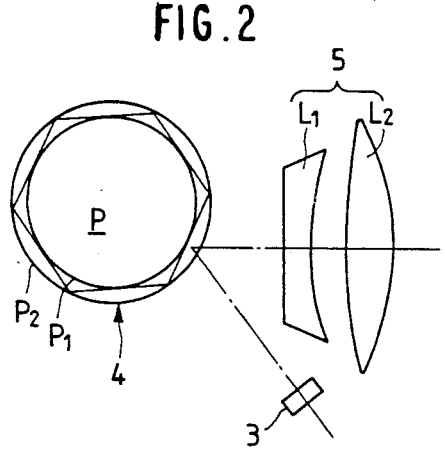
FIG.3(a)
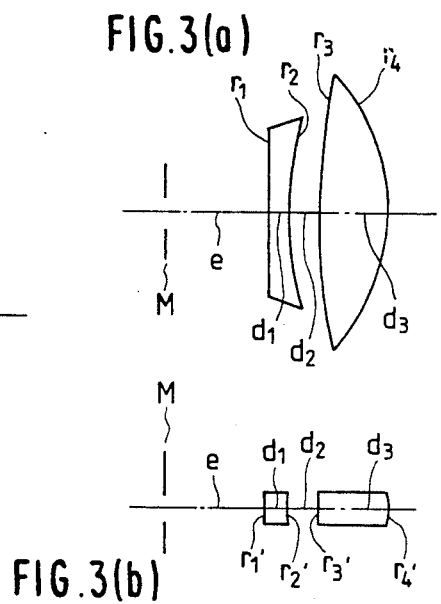
FIG.3(b)

SPHERICAL
ABERRATION

FIELD
CURVATURE

LINEARITY
ERROR

SPHERICAL
ABERRATION

FIELD
CURVATURE

LINEARITY
ERROR

SPHERICAL
ABERRATION

FIELD
CURVATURE

LINEARITY
ERROR

SPHERICAL
ABERRATION

FIELD
CURVATURE

LINEARITY
ERROR

SPHERICAL ABERRATION

FIELD CURVATURE

LINEARITY ERROR

SPHERICAL ABERRATION

FIELD CURVATURE

LINEARITY ERROR

SPHERICAL
ABERRATION

FIELD
CURVATURE

LINEARITY
ERROR

SCANNING OPTICAL SYSTEM FOR USE IN A LASER BEAM PRINTER

BACKGROUND OF THE INVENTION

The present invention relates to an improved small-scale and low-cost optical scanning system for use in a laser beam printer which uses a semiconductor laser as a light source.

An optical scanning system for a laser beam printer consists basically of a light source section which issues a light beam, a deflector for deflecting the light beam, and a scanning lens unit which converges the deflected rays of light at a position proportional to the angle of deflection. A semiconductor laser which is small and directly tunable is commonly employed as the light source. Since light from a semiconductor laser is divergent, it is usually employed together with a collimator lens which collimates the laser beam.

The angle of divergence of the laser light emitted from the semiconductor laser differs in two directions, i.e., a direction parallel to the junction plane of the laser (this direction is hereinafter referred to as a parallel direction) and a direction normal to the junction plane of the laser (which is hereunder referred to as a normal direction). Since the angle of divergence is larger in the normal direction than in the parallel direction, the diameter of the parallel beam obtained as a result of passage through the collimator lens is larger in the normal direction than in the parallel direction. As a consequence, the rays of light that are finally converged on a scanning surface by the scanning lens unit have an F number that is smaller in the normal direction, and the spot diameter, which is proportional to the F number of these rays of light, is larger in the parallel direction.

In order to solve this problem, the aperture diameter of the collimator lens has been made sufficiently small so that it blocks unwanted rays of light in the normal direction, thereby producing a beam spot having substantially the same diameter in both parallel and normal directions, at the sacrifice of energy efficiency. An alternative approach has been to employ an anamorphic optical system such as a prism for the purpose of shaping the beam.

Another problem with conventional printers is that a deflector such as a rotating polygonal mirror causes unevenness in the pitch of scanning lines because of "tilting" which involves an error in a direction (which is hereunder referred to as an auxiliary scanning direction) that is normal to a main scanning direction.

Two methods have been proposed for correcting this problem. One method consists of placing an anamorphic optical system in front of the deflector so that laser light is imaged on the deflecting plane, which is coincident with a cross section of the scanning optical system taken in the auxiliary scanning direction, with the scanning lens system also being made to have an anamorphic composition that allows laser light to be reimaged on the scanning surface, so that it is conjugative with the deflecting plane to eliminate adverse effects of tilting. The other method comprises using an anamorphic optical system and a scanning lens system in such a way that the focal distance and magnification in the auxiliary scanning direction are sufficiently reduced to minimize the unwanted effects of tilting.

The first method which involves linear imaging of laser light on the deflecting plane is vulnerable to flaws or dust particles on the deflecting plane. Furthermore, changes in the deflecting point of the rotating polygonal mirror cause such strong effects that it is difficult to maintain desired performance over the full range of the scanning width. The second method necessitates the use of a complex optical system in order to suitably achieve the beam shaping. Furthermore, in order to compensate for the insufficient "tilting" correction, a high degree of dimensional precision is required of the rotating polygonal mirror, leading to increased production costs.

An $f\cdot\theta$ lens characterized by proportionality between the angle of incidence and the height of an image is commonly used in the scanning lens system for converging deflected rays of light on the scanning surface at a position proportional to the angle of deflection. However, in order to attain the proportionality (hereinafter referred to as linearity) between the incident angle and image height, the $f\cdot\theta$ lens has a strong negative distortion and requires that the error that might occur in this linearity be very small.

SUMMARY OF THE INVENTION

The present invention has been accomplished under the circumstances described above and it is an object of the present invention to provide a scanning optical system for use in a laser beam printer which is of high performance and available at low cost, and yet is capable of effective compensation for tilting and beam shaping.

The object of the present invention can be attained by a scanning optical system that comprises a cylindrical lens for imaging laser light in an auxiliary scanning cross section at a point in front of a deflector and an anamorphic scanning lens unit which converges the light rays deflected by the deflector at a point on a scanning surface, said scanning lens unit having, in order from the deflector side, a first lens which is a negative lens element having a concave toric surface with a stronger curvature in the auxiliary scanning cross section and a second lens having a convex toric surface with a stronger curvature in the auxiliary scanning cross section. This optical system also satisfies the following condition:

$$0.015f < 1 < 0.160f \qquad (1)$$

where f is the focal length of the scanning lens unit in a main scanning across section, and l is the distance between the position at which laser light is imaged with the cylindrical lens and the point at which the laser light is deflected with the deflector.

In a preferred embodiment, the first lens has a concave toric surface on the scanning surface side.

In another preferred embodiment, the first lens has a concave toric surface on the deflector side.

In another preferred embodiment, the first lens has a concave toric surface on both sides.

In still another preferred embodiment, the first lens has a convex toric surface on the deflector side.

In yet another preferred embodiment, the second lens has a planar surface on the deflector side.

In still another preferred embodiment, the second lens has a refractive index $n_2$ which satisfies the following condition:

$$n_2 < 1.6 \qquad (2)$$

BRIEF DESCRIPTION OF THE DRAWINGS

FIG. 1 is a general view showing the composition of a scanning optical system according to the present invention, with FIG. 1(a) showing its main scanning cross section, and FIG. 1(b) showing its auxiliary scanning cross section.

FIG. 2 is a layout of a polygonal mirror used as a deflector.

FIGS. 3(a) and 3(b) are diagrammatic illustrations of the scanning lens unit in the optical system according to the views of FIGS. 1(a) and 1(b), respectively.

FIGS. 4(a)–10(a) are graphs of spherical aberration obtained with scanning lens units constructed in accordance with the specific numerical data given as examples herein, with the dotted line curves corresponding to the main scanning direction and the solid line curves corresponding to the auxiliary scanning direction.

FIGS. 4(b)–10(b) graphs of field curvature obtained with scanning lens units constructed in accordance with the specific numerical data given as examples herein, with the dotted line curves corresponding to the main scanning direction and the solid line curves corresponding to the auxiliary scanning direction.

FIGS. 4(c)–10(c) are graphs of linearity error obtained with scanning lens units constructed in accordance with the specific numerical data given as examples herein, with the dotted line curves corresponding to the main scanning direction and the solid line curves corresponding to the auxiliary scanning direction.

DETAILED DESCRIPTION OF THE PREFERRED EMBODIMENTS

Figure 4A:
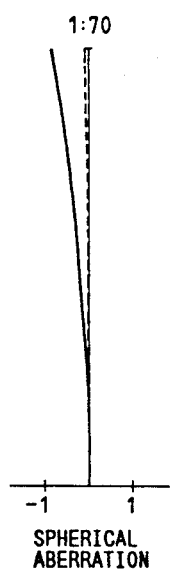

Condition (1) specifies the distance from the focusing point $F_1$ of an image formed by the cylindrical lens to the deflecting plane. If l is smaller than the lower limit, the area of the image produced on the deflecting surface is reduced and thus becomes sensitive to surface flaws or dust particles. Furthermore, the effects of a change in the point of deflection become so large that there is a possibility that the desired performance cannot be guaranteed over the full range of scanning angles. If l exceeds the upper limit, the effectiveness in compensating for tilting is reduced, and there occurs a possibility that the pitch between scanning lines will become nonuniform.

Embodiments of the present invention are described hereinafter with reference to the accompanying drawings.

FIG. 1 shows a scanning optical system for use in a laser beam printer according to an embodiment of the present invention. FIG. 1(a) shows a cross section of this scanning optical system as taken in the main scanning direction (this is hereinafter referred to simply as the main scanning cross section), and FIG. 1(b) shows a cross section of the same scanning optical system taken in the auxiliary scanning direction (this is hereinafter referred to as the auxiliary scanning cross section).

The scanning optical system shown in FIG. 1 comprises a semiconductor laser 1, a collimator lens 2 with which the laser light from the semiconductor laser 1 is converted to generally parallel rays of light, a cylindrical lens 3 that has a curvature in the auxiliary scanning cross section and which images the laser light in the auxiliary scanning cross section, a deflector 4 disposed behind a focusing position $F_1$ where the laser light is imaged in the auxiliary scanning cross section by means of the cylindrical lens 3, and an anamorphic scanning lens unit 5 which converges the rays of light that have been deflected with the deflector 4 on a scanning surface 6.

In FIG. 1, $H_f$ and $H_b$ denote front and back principal points in the main scanning cross section, and $H'_f$ and $H'_b$ signify front and back principal points in the auxiliary scanning cross section.

If a polygonal mirror P is to be used as deflector 4 in the scanning optical system described above, it should of course be disposed in such a way that the optical axis O is deflected along the line extending from the point of deflection M as shown in FIG. 2. The point of deflection M should lie on the optical axis between the inscribed circle $P_1$ and circumscribed circle $P_2$ of the polygonal mirror P.

The composition of the scanning lens unit 5 used in the present invention is shown in FIG. 3. It has a two-element composition consisting of, in order from the deflector side, the first lens $L_1$ which is a negative lens element having a concave toric surface with a stronger curvature in the auxiliary scanning cross section and the second lens $L_2$ having a convex toric surface with a stronger curvature in the auxiliary scanning cross section.

The scanning lens unit 5 has a shorter focal length in the auxiliary scanning cross section than in the main scanning direction and forms an image at a finite distance with the object point lying at focusing point $F_1$ where image is formed by the cylindrical lens 3. Because of this feature, the scanning lens unit 5 greatly reduces the effects of tilting of the deflector 4 positioned between the focusing point $F_1$ and the scanning lens unit 5.

If the focal length of the cylindrical lens 3 is adjusted so that the focusing point $F_1$ where an image is formed by the cylindrical lens 3 in the auxiliary scanning cross section is kept constant, the overall focal length in the auxiliary scanning direction can be altered, thereby changing the degree of beam shaping. Therefore, even if the shape of an incident laser beam changes on account of the elliptical ratio of a semiconductor laser or the NA of the collimator lens, optimal beam shaping can be accomplished to produce an imaging spot having a desired shape.

If the focusing point $F_1$ coincides with the deflector 4, a so-called conjugative system results and an infinite magnification of compensation is attained. However, the change in the point of deflection at a polygonal mirror or the error introduced during the machining of a difficult-to-work toric lens, can cause the conjugative point on the image plane to be shifted, which results in great variation in the efficiency of compensation for tilting.

Therefore, in order to avoid adverse effects of a shift in the conjugative point on the image plane that might be caused by errors in machining, the present invention requires that the focusing point $F_1$ be intentionally offset from the point of deflection.

An attendant advantage that results from this arrangement is that an incident beam falls on the deflecting surface over a certain area, rather than forming a line image, and hence is highly resistant to flaws or dust particles on the deflecting surface.

The first lens $L_1$ in the scanning lens unit 5 has a negative power in the main scanning cross section, so it is able to compensate for the spherical aberration and coma that may be produced in the positive second lens $L_2$. At the same time, the first lens $L_1$ allows incident light to be launched into the second lens $L_2$ at a position remote from the optical axis, thereby creating a negative distortion strong enough to improve the linearity between the incident angle and image height of the f·θ lens.

The second lens $L_2$ produces a strong negative distortion on the deflector side and thus assures the necessary linearity for the f·θ lens. At the same time, the positive power of the second lens that occurs on the scanning surface side enables the incident rays of light to be focused on the scanning surface 6.

The rays of light that are launched into the scanning lens unit 5 are divergent in the auxiliary scanning cross section, so the scanning lens unit 5 requires a stronger power in the auxiliary scanning cross section than in the main scanning cross section. The second lens $L_2$ has a toric surface on the side of the scanning surface 6, which has a stronger curvature in the auxiliary scanning cross section than in the main scanning cross section. Consequently, it is capable of producing a great positive power. In addition, the power distribution between this positive toric surface and the negative toric surface of the first lens $L_1$ is such that curvature of the field that might occur in the auxiliary scanning direction can be efficiently compensated.

In the system of the present invention, a concave toric surface is combined with a convex toric surface, and this is effective not only in efficient compensation for curvature of the field but also in minimizing degradation of extra-axial wavefront aberration. Therefore, even if incident rays are deviated in the auxiliary scanning direction, the combined actions of the concave and convex toric surfaces will cancel aberrations to maintain good performance.

If the second lens $L_2$ is made of an optical glass material having a high refractive index, the high refractive index combines with the concave toric action of $L_2$ not only to accomplish effective compensation for curvature of the field but also to minimize spherical aberration, thereby realizing a wide viewing angle converting the scanning angle to ±48 degrees. If desired, the second lens $L_2$ may have a planar surface on the deflector side with a view to improving the machinability of a convex toric lens.

In addition, because of the concave toric action of the first lens $L_1$, the second lens $L_2$ does not necessarily have a very high refractive index and, instead, it may be formed of a low-index optical glass or plastic material that satisfies condition (2). In this case, the cost of optical material can be reduced.

Seven sets of preferred numerical data for the scanning lens unit 5 which is part of the scanning optical system of the present invention are described below, in which: $r_i$ is the radius of curvature of an "ith" surface in the main scanning cross section as counted from the deflector side; $r'_i$ is the radius of curvature of the ith surface in the auxiliary scanning cross section; $d_i$ is the thickness or aerial distance of a lens between "ith" and "i+1"th surfaces; $n_i$ is the refractive index of a lens between "ith" and "i+1"th surfaces at an operating wavelength; "e" is the distance between the point of deflection M and the first surface; l is the distance between the focusing point $F_1$ and the point of deflection M in the auxiliary scanning cross section; fb is the distance between the scanning lens unit and the scanning surface; and f is the focal length in the main scanning direction.

Figure 4B:
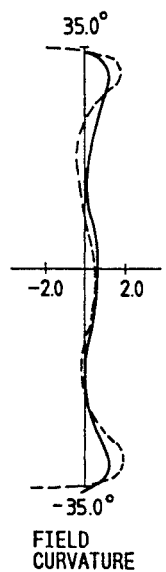
Figure 4C:
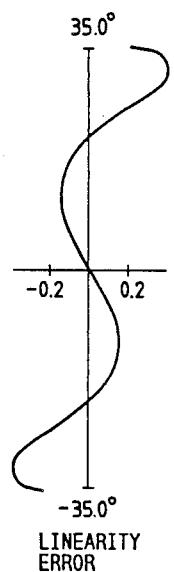
Figure 5A:
Figure 5B:
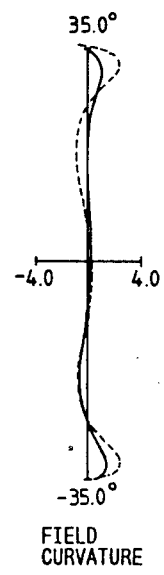
Figure 5C:
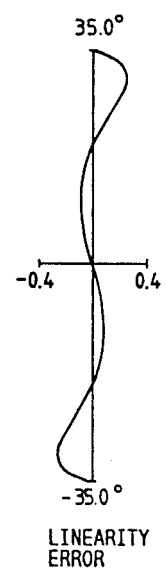
Figure 6A:
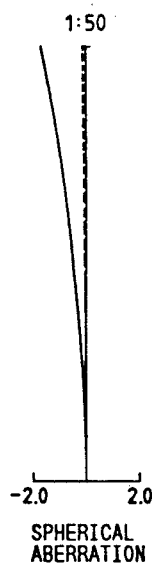
Figure 6B:
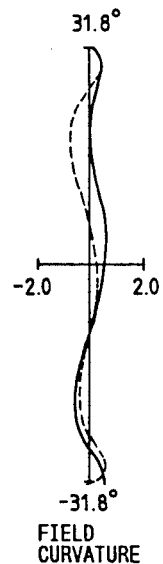
Figure 6C:
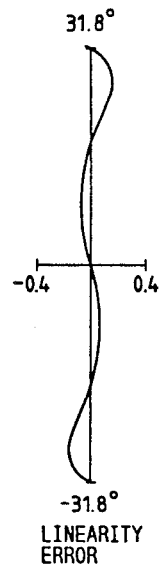
Figure 7A:
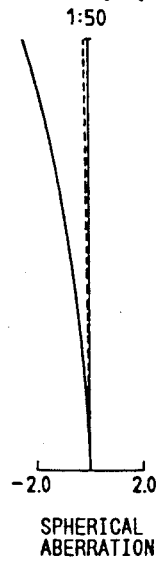
Figure 7B:
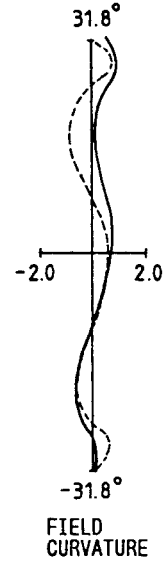
Figure 7C:
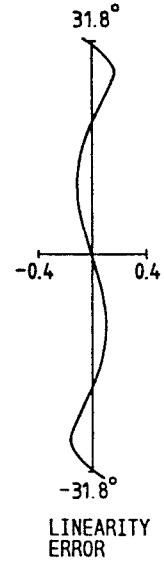
Figure 8A:
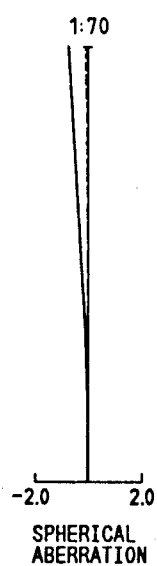
Figure 8B:
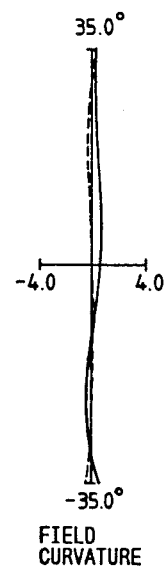
Figure 8C:
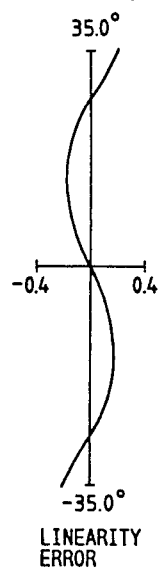
Figure 9A:
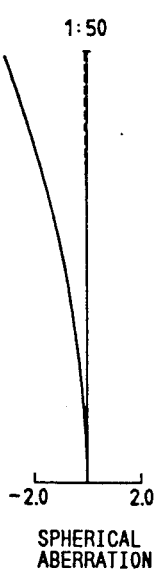
Figure 9B:
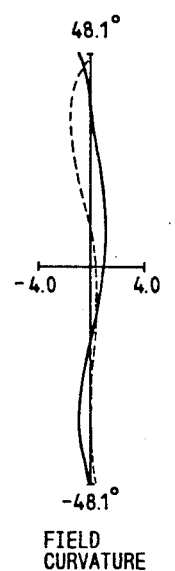
Figure 9C:
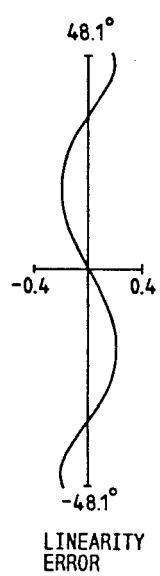
Figure 10A:
Figure 10B:
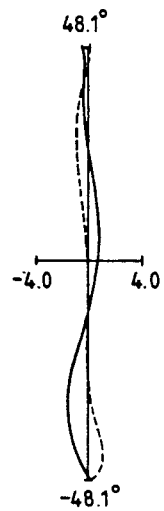
Figure 10C:
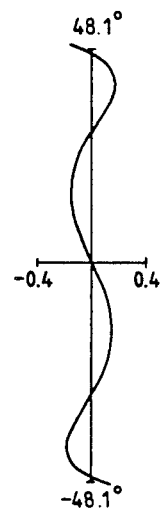

FIG. 4 is a graph plotting the aberration curves obtained with a scanning optical system constructed on the basis of the data shown in Table 1. FIGS. 5-10 are graphs plotting the aberration curves obtained with scanning optical systems constructed on the basis of the data shown in Tables 2-7, respectively.

The embodiments shown in Tables 1-5 employ a first lens having a concave toric surface on the scanning surface side. The embodiments shown in Tables 6 and 7 employ a first lens having a concave toric surface on the deflector side. The embodiment shown in Table 7 employs a first lens having a concave toric surface on both sides. The embodiment shown in Tables 2 and 4 employ a first lens having a convex toric surface on the deflector side. The embodiments shown in Tables 5-7 employ a second lens having a planar surface on the deflector side. The embodiments shown in Tables 1-4 employ a second lens having a refractive index which is less than 1.6.

TABLE 1

| i | f = 179.25<br>$r_i$ | fb = 187.25<br>$r'_i$ | e = 34.01<br>$d_i$ | l = 0.058<br>$n_i$ |
|---|---|---|---|---|
| 1 | 1244.00 | 1244.00 | 7.50 | 1.48479 |
| 2 | 142.50 | 46.34 | 10.91 | |
| 3 | 252.50 | 252.50 | 24.52 | 1.48479 |
| 4 | −76.90 | −23.40 | | |

TABLE 2

| i | f = 179.50<br>$r_i$ | fb = 185.00<br>$r'_i$ | e = 35.45<br>$d_i$ | l = 0.028<br>$n_i$ |
|---|---|---|---|---|
| 1 | 487.37 | 297.00 | 7.65 | 1.48479 |
| 2 | 136.60 | 40.50 | 11.63 | |
| 3 | 243.50 | 243.50 | 24.47 | 1.48479 |
| 4 | −82.50 | −22.86 | | |

TABLE 3

| i | f = 269.58<br>$r_i$ | fb = 281.84<br>$r'_i$ | e = 54.87<br>$d_i$ | l = 0.102<br>$n_i$ |
|---|---|---|---|---|
| 1 | −5376.40 | −5376.40 | 15.72 | 1.48479 |
| 2 | 255.80 | 81.90 | 16.74 | |
| 3 | 445.92 | 445.92 | 31.99 | 1.58200 |
| 4 | −140.20 | −45.00 | | |

TABLE 4

| i | f = 269.53<br>$r_i$ | fb = 287.00<br>$r'_i$ | e = 52.25<br>$d_i$ | l = 0.055<br>$n_i$ |
|---|---|---|---|---|
| 1 | 1100.00 | 288.00 | 16.54 | 1.48479 |
| 2 | 211.70 | 67.40 | 16.93 | |
| 3 | 356.77 | 356.77 | 33.23 | 1.51072 |
| 4 | −129.50 | −38.20 | | |

TABLE 5

| i | f = 178.98<br>$r_i$ | fb = 197.73<br>$r'_i$ | e = 19.43<br>$d_i$ | l = 0.060<br>$n_i$ |
|---|---|---|---|---|
| 1 | −233.70 | −233.70 | 21.73 | 1.48479 |
| 2 | 758.00 | 42.00 | 13.29 | |
| 3 | ∞ | ∞ | 23.96 | 1.67496 |
| 4 | −89.70 | −29.80 | | |

TABLE 6

| i | f = 124.46<br>$r_i$ | fb = 134.90<br>$r'_i$ | e = 15.66<br>$d_i$ | l = 0.140<br>$n_i$ |
|---|---|---|---|---|
| 1 | −156.80 | −14.05 | 16.12 | 1.48479 |
| 2 | 1152.57 | 1152.57 | 2.25 | |
| 3 | ∞ | ∞ | 24.60 | 1.76591 |

TABLE 6-continued

| i | f = 124.46 ri | fb = 134.90 ri' | e = 15.66 di | l = 0.140 ni |
|---|---|---|---|---|
| 4 | −72.25 | −24.92 | | |

TABLE 7

| i | f = 124.41 ri | fb = 135.90 ri' | e = 11.45 di | l = 0.152 ni |
|---|---|---|---|---|
| 1 | −150.10 | −76.70 | 14.12 | 1.48479 |
| 2 | 1146.20 | 62.20 | 5.03 | |
| 3 | ∞ | ∞ | 21.84 | 1.71230 |
| 4 | −66.70 | −24.70 | | |

As described on the foregoing pages, the scanning lens unit incorporated in the system of the present invention has a shorter focal length in the auxiliary scanning cross section than in the main scanning direction and forms an image at a finite distance with the object lying at the focusing point where image is formed by the cylindrical lens. Consequently, the scanning lens unit greatly reduces the effects of tilting of the deflector positioned between the focusing point and the scanning lens unit. Having these features, the scanning optical system of the present invention is very effective in compensating for tilting and in beam shaping, and yet is resistant to flaws or dust particles on the deflecting surface.

In the scanning lens unit of the system of the present invention, a concave toric surface is combined with a convex toric surface and this arrangement is effective not only in efficient compensation for curvature of the field but also in minimizing degradation of extra-axial wavefront aberration.

Where the second lens is made of an optical material having a high refractive index, it may be designed to have a planar surface on the deflector side so as to improve the machinability of a convex toric lens.

By virtue of the concave toric action of the first lens, the second toric lens does not necessarily have a very high refractive index and may be made of an inexpensive optical glass or plastic material, which offers the added advantage of reducing the production cost of the scanning system.

What is claimed is:

1. A scanning optical system for use in a laser beam printer that comprises a cylindrical lens for imaging laser light in an auxiliary scanning cross section at a point in front of a deflector and an anamorphic scanning lens unit which converges light rays deflected by the deflector at a point on a scanning surface, said scanning lens unit having, in order from the deflector side, a first lens which is a negative lens element having a concave toric surface with a stronger curvature in the auxiliary scanning cross section and a second lens having a convex toric surface with a stronger curvature in the auxiliary scanning cross section, said optical system further satisfying the following condition:

$$0.015f < l < 0.160f$$

where f is the focal length of the scanning lens unit in a main scanning cross section, and l is the distance between a position at which laser light is imaged with the cylindrical lens and the point at which the laser light is deflected with the deflector.

2. A scanning optical system according to claim 1, wherein said first lens has a concave toric surface on the scanning surface side.

3. A scanning optical system according to claim 1, wherein said first lens has a concave toric surface on the deflector side.

4. A scanning optical system according to claim 1, wherein said first lens has a concave toric surface on both sides.

5. A scanning optical system according to claim 1, wherein said first lens has a convex toric surface on the deflector side.

6. A scanning optical system according to claim 1, wherein said second lens has a planar surface on the deflector side.

7. A scanning optical system according to claim 1, wherein said second lens has a refractive index $n_2$ which satisfies the following condition:

$$n_2 < 1.6.$$

8. A scanning system according to claim 1, further meeting the following chart:

| i | f = 179.25 ri | fb = 187.25 ri' | e = 34.01 di | l = 0.058 ni |
|---|---|---|---|---|
| 1 | 1244.00 | 1244.00 | 7.50 | 1.48479 |
| 2 | 142.50 | 46.34 | 10.91 | |
| 3 | 252.50 | 252.50 | 24.52 | 1.48479 |
| 4 | −76.90 | −23.40 | | |

9. A scanning system according to claim 1, further meeting the following chart:

| i | f = 179.50 ri | fb = 185.00 ri' | e = 35.45 di | l = 0.028 ni |
|---|---|---|---|---|
| 1 | 487.37 | 297.00 | 7.65 | 1.48479 |
| 2 | 136.60 | 40.50 | 11.63 | |
| 3 | 243.50 | 243.50 | 24.47 | 1.48479 |
| 4 | −82.50 | −22.86 | | |

10. A scanning system according to claim 1, further meeting the following chart:

| i | f = 179.50 ri | fb = 185.00 ri' | e = 35.45 di | l = 0.028 ni |
|---|---|---|---|---|
| 1 | −5376.40 | −5376.40 | 15.72 | 1.48479 |
| 2 | 255.80 | 81.90 | 16.74 | |
| 3 | 445.92 | 445.92 | 31.99 | 1.58200 |
| 4 | −140.20 | −45.00 | | |

11. A scanning system according to claim 1, further meeting the following chart:

| i | f = 269.93 ri | fb = 287.00 ri' | e = 52.25 di | l = 0.055 ni |
|---|---|---|---|---|
| 1 | 1100.00 | 288.00 | 16.54 | 1.48479 |
| 2 | 211.70 | 67.40 | 16.93 | |
| 3 | 356.77 | 356.77 | 33.23 | 1.51072 |
| 4 | −129.50 | −38.20 | | |

12. A scanning system according to claim 1, further meeting the following chart:

| | f = 178.98 | fb = 197.73 | e = 19.43 | l = 0.060 |
|---|---|---|---|---|
| i | ri | ri' | di | ni |
| 1 | −233.70 | −233.70 | 21.73 | 1.48479 |
| 2 | 758.00 | 42.00 | 13.29 | |
| 3 | ∞ | ∞ | 23.96 | 1.67496 |
| 4 | −89.70 | −29.80 | | |

13. A scanning system according to claim 1, further meeting the following chart:

| | f = 124.46 | fb = 134.90 | e = 15.66 | l = 0.140 |
|---|---|---|---|---|
| i | ri | ri' | di | ni |
| 1 | −156.80 | −14.05 | 16.12 | 1.48479 |
| 2 | 1152.57 | 1152.57 | 2.25 | |
| 3 | ∞ | ∞ | 24.60 | 1.76591 |
| 4 | −72.25 | −24.92 | | |

14. A scanning system according to claim 1, further meeting the following chart:

| | f = 124.41 | fb = 135.90 | e = 11.45 | l = 0.152 |
|---|---|---|---|---|
| i | ri | ri' | di | ni |
| 1 | −150.10 | −76.70 | 14.12 | 1.48479 |
| 2 | 1146.20 | 62.20 | 5.03 | |
| 3 | ∞ | ∞ | 21.84 | 1.71230 |
| 4 | −66.70 | −24.70 | | |

* * * * *